United States Patent
Yu et al.

(10) Patent No.: US 10,454,806 B2
(45) Date of Patent: Oct. 22, 2019

(54) SDN CONTROLLER, DATA CENTER SYSTEM, AND ROUTING CONNECTION METHOD

(71) Applicant: Huawei Technologies Co., Ltd., Shenzhen (CN)

(72) Inventors: Qinghua Yu, Shenzhen (CN); Xinhua Yang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 426 days.

(21) Appl. No.: 15/199,194

(22) Filed: Jun. 30, 2016

(65) Prior Publication Data
US 2016/0315845 A1 Oct. 27, 2016

Related U.S. Application Data

(63) Continuation of application No. PCT/CN2014/093478, filed on Dec. 10, 2014.

(30) Foreign Application Priority Data

Dec. 31, 2013 (CN) .......................... 2013 1 0754276

(51) Int. Cl.
*H04L 12/715* (2013.01)
*H04L 12/751* (2013.01)
*H04L 12/703* (2013.01)

(52) U.S. Cl.
CPC .............. *H04L 45/02* (2013.01); *H04L 45/28* (2013.01); *H04L 45/64* (2013.01)

(58) Field of Classification Search
CPC ......... H04L 45/02; H04L 45/28; H04L 45/64; H04L 45/56; H04L 56/563; H04L 45/566; H04L 41/0654
See application file for complete search history.

(56) References Cited

U.S. PATENT DOCUMENTS 9,450,817 B1* 9/2016 Bahadur ................. H04L 45/64
9,455,911 B1* 9/2016 Poutievski ............ H04L 45/745
(Continued)

FOREIGN PATENT DOCUMENTS

CN 101431698 A 5/2009
CN 103051539 A 4/2013
(Continued)

OTHER PUBLICATIONS

Machine Translation and Abstract of International Publication No. WO2013082983, Jun. 13, 2013, 13 pages.
(Continued)

*Primary Examiner* — Andrew Lai
*Assistant Examiner* — M Mostazir Rahman
(74) *Attorney, Agent, or Firm* — Conley Rose, P.C.

(57) ABSTRACT

A software defined networking (SDN) controller, a data center system, and a routing connection method relates to the field of communications technologies, where the method may use to resolve a technical problem in the prior art that a data center network cannot complete recovery of a communication fault. The SDN controller includes a receiver configured to receive a route calculation request sent by an endpoint device manager, where the route calculation request carries information about endpoint devices of both communication parties that need to perform route calculation, and a processor configured to perform route calculation for the endpoint devices of the both communication parties that need to perform route calculation, and control, according to calculated route information, a forwarding device to perform routing connection for the endpoint devices of the both communication parties.

16 Claims, 7 Drawing Sheets

(56) References Cited

U.S. PATENT DOCUMENTS

| | | | |
|---|---|---|---|
| 2008/0151755 A1 | 6/2008 | Nishioka | |
| 2011/0286358 A1* | 11/2011 | Nian | H04Q 11/0062 370/254 |
| 2013/0124707 A1* | 5/2013 | Ananthapadmanabha | H04L 45/7457 709/223 |
| 2013/0250770 A1* | 9/2013 | Zou | H04L 47/19 370/238 |
| 2014/0146664 A1* | 5/2014 | Amante | H04L 45/50 370/228 |
| 2016/0087873 A1* | 3/2016 | Wang | H04L 45/02 370/254 |
| 2016/0127223 A1* | 5/2016 | Kern | H04L 45/02 370/225 |
| 2016/0142326 A1* | 5/2016 | Akiyoshi | H04L 45/586 370/236 |
| 2016/0315847 A1* | 10/2016 | Zhang | H04L 12/6418 |

FOREIGN PATENT DOCUMENTS

| | | |
|---|---|---|
| CN | 103200097 A | 7/2013 |
| JP | 2008160385 A | 7/2008 |
| JP | 2012050025 A | 3/2012 |
| KR | 20130033252 A | 4/2013 |
| WO | 2013082983 A1 | 6/2013 |
| WO | 2013145780 A1 | 10/2013 |

OTHER PUBLICATIONS

Foreign Communication From a Counterpart Application, Chinese Application No. 201310754276.4, Chinese Office Action dated Jul. 4, 2017, 6 pages.

Machine Translation and Abstract of Japanese Publication No. JP2012050025, Mar. 8, 2012, 22 pages.

Machine Translation and Abstract of Korean Publication No. KR20130033252, Apr. 3, 2013, 25 pages.

Foreign Communication From a Counterpart Application, Korean Application No. 10-2016-7020769, Korean Notice of Allowance and Brief Translation dated Mar. 14, 2018, 3 pages.

"OpenFlow Switch Specification," Open Networking Foundation, Version 1.4.0 (Wire Protocol 0x05), ONF TS-012, Oct. 14, 2013, 206 pages.

"Series G: Transmission Systems and Media, Digital Systems and Networks, Packet over Transport aspect—Ethernet over Transport aspects, Series Y: Global Information Infrastructure, Internet Protocol Aspects and Next-Generation Networks, Internet protocol aspects—Operation, administration and maintenance, OAM functions and mechanisms for Ethernet based networks," ITU-T, G.8013/Y.1731, Nov. 2013, 99 pages.

Foreign Communication From a From a Counterpart Application, European Application No. 14877018.3, Extended European Search Report dated Oct. 27, 2016, 7 pages.

Foreign Communication From a Counterpart Application, PCT Application No. PCT/CN2014/093478, English Translation of International Search Report dated Mar. 16, 2015, 2 pages.

Foreign Communication From a Counterpart Application, PCT Application No. PCT/CN2014/093478, English Translation of Written Opinion dated Mar. 16, 2015, 7 pages.

Foreign Communication From a Counterpart Application, Japanese Application No. 2016-544065, Japanese Office Action dated Jul. 18, 2019, 3 pages.

Foreign Communication From a Counterpart Application, Japanese Application No. 2016-544065, English Translation of Japanese Office Action dated Jul. 18, 2019, 3 pages.

* cited by examiner

SDN CONTROLLER, DATA CENTER SYSTEM, AND ROUTING CONNECTION METHOD

CROSS-REFERENCE TO RELATED APPLICATIONS

This application is a continuation of International Application No. PCT/CN2014/093478, filed on Dec. 10, 2014, which claims priority to Chinese Patent Application No. 201310754276.4, filed on Dec. 31, 2013, both of which are hereby incorporated by reference in their entireties.

TECHNICAL FIELD

The present disclosure relates to the field of communications technologies, and in particular, to a software defined networking (SDN) controller, a data center system, and a routing connection method.

BACKGROUND

Telecommunications network element cloudification means that a traditional telecommunications network element and an application that are based on a physical subrack and a board are deployed on a universal data center server in a software virtual machine (VM) manner, and various telecommunications services are provided. This deployment manner is referred to as network functions virtualization (NFV) in the industry. In a cloudified data center, a telecommunications network element and an application exist in a VM form, and do not exist in a form of a traditional telecommunications hardware board. Communication between one network element and another network element, and communication between different service progresses within a same network element are both presented as communication between VMs. As shown in FIG. 1A, FIG. 1A is an architectural model diagram of a data center networking architecture and cloudified deployment of a telecommunications network element in the prior art.

To ensure reliability of communication between VMs, during networking of a data center network, the following reliability mechanism may be used, as shown in FIG. 1B.

1. Reliability of a local area network (LAN) switch (LSW) node is ensured using an intelligent stack (iStack)/cluster switch system (CSS) technology.

2. A link aggregation group (LAG) trunk link is established between LSWs, and a physical redundant link is provided. After one or more links become faulty, traffic is automatically switched to another normal physical link in a trunk group.

3. An Ethernet fault detection protocol such as Institute of Electrical and Electronics Engineers (IEEE) 802.3ah Ethernet operation administration and maintenance (OAM) is deployed between LSWs in a data center to monitor a link fault.

However, only link-by-link fault detection is performed in IEEE 802.3ah Ethernet OAM, and end-to-end fault detection cannot be performed. From a point of view of fault detection, the link-by-link fault detection cannot replace the end-to-end fault detection. Moreover, only fault detection is performed in Ethernet OAM, and is not integrated with a fault protection switching mechanism, and a communication fault cannot automatically recover.

To resolve a problem in the foregoing solution that end-to-end communication fault detection cannot be performed on a VM, an Internet Protocol (IP) flow performance measurement (FPM) solution is proposed in the industry. As shown in FIG. 1C, FIG. 1C is a schematic diagram of IP FPM. In this solution, a detection function is deployed on an edge device (a router or an LSW) of a network, and with reference to time synchronization of the entire network, an end-to-end communication fault of the VM is detected using a series of feature packet detection and statistical algorithms at an ingress and an egress of the network. The solution may resolve problems of IP statistical accuracy and transmission path monitoring in networking such as multihoming access and link trunk such that end-to-end service communication quality in a bottom-layer IP bearer network can be accurately monitored, and a fault of an end-to-end communication path can be found in time.

However, IP FPM can only complete the end-to-end fault detection, but cannot complete fault recovery.

SUMMARY

Embodiments of the present disclosure provide an SDN controller, a data center system, and a routing connection method in order to resolve a technical problem in the prior art that a data center network cannot complete fault recovery.

According to a first aspect of the present disclosure, a SDN controller is provided, including a receiver configured to receive a route calculation request sent by an endpoint device manager, where the route calculation request carries information about endpoint devices of both communication parties that need to perform route calculation, and a processor configured to perform route calculation for the endpoint devices of the both communication parties that need to perform route calculation, and control, according to calculated route information, a forwarding device to perform routing connection for the endpoint devices of the both communication parties.

With reference to the first aspect, in a first possible implementation manner, the information about the endpoint devices of the both communication parties includes one or more of identification information and topology location information of the endpoint devices of the both communication parties.

With reference to the first aspect, in a second possible implementation manner, the information about the endpoint devices of the both communication parties that need to perform route calculation is obtained in the following manner: the endpoint device manager receives quality information that is reported by an endpoint device and that is about communication with another endpoint device, and obtains, by screening, endpoint devices of both communication parties whose communication quality does not satisfy a preset communication quality requirement.

With reference to the first aspect, in a third possible implementation manner, the information about the endpoint devices of the both communication parties that need to perform route calculation is obtained in the following manner: the endpoint device manager receives identification information that is reported by an endpoint device and that is of endpoint devices of both communication parties whose communication quality does not satisfy a preset communication quality requirement.

With reference to the third possible implementation manner of the first aspect, in a fourth possible implementation manner, the information about the endpoint devices of the both communication parties that need to perform route calculation is obtained in the following manner: after detecting and obtaining communication quality information about communication with the peer endpoint device, the endpoint device determines the identification information of the endpoint devices of the both communication parties that do not satisfy the preset communication quality requirement.

With reference to the first aspect, in a fifth possible implementation manner, the receiver is further configured to receive, using a newly added interface of the endpoint device manager, the route calculation request sent by the endpoint device manager, or receive, using a unified arrangement module, the route calculation request sent by the endpoint device manager.

With reference to the fifth possible implementation manner of the first aspect, in a sixth possible implementation manner, the newly added interface uses the representational state transfer (REST) protocol.

According to a second aspect of the present disclosure, a data center system is provided, including an endpoint device manager and an SDN controller, where the endpoint device manager is configured to send a route calculation request to the SDN controller, and the route calculation request carries information about endpoint devices of both communication parties that need to perform route calculation, and the SDN controller is configured to perform, according to the route calculation request, route calculation for the endpoint devices of the both communication parties that need to perform route calculation, and control, according to calculated route information, a forwarding device to perform routing connection for the endpoint devices of the both communication parties.

With reference to the second aspect, in a first possible implementation manner, the endpoint device manager is further configured to receive quality information that is reported by an endpoint device and that is about communication with another endpoint device, obtain, by screening, endpoint devices of both communication parties whose communication quality does not satisfy a preset communication quality requirement, and add the identification information of the endpoint devices of the both communication parties to the route calculation request as the information about the endpoint devices of the both communication parties that need to perform route calculation.

With reference to the second aspect, in a second possible implementation manner, the endpoint device manager is further configured to receive identification information that is reported by an endpoint device and that is of endpoint devices of both communication parties whose communication quality does not satisfy a preset communication quality requirement, and add the identification information to the route calculation request as the information about the endpoint devices of the both communication parties that need to perform route calculation.

According to a third aspect of the present disclosure, a routing connection method is provided, including receiving, by an SDN controller, a route calculation request sent by an endpoint device manager, where the route calculation request carries information about endpoint devices of both communication parties that need to perform route calculation, performing, by the SDN controller according to the information about the endpoint devices of the both communication parties, route calculation for the endpoint devices of the both communication parties that need to perform route calculation, and controlling, by the SDN controller according to calculated route information, a forwarding device to perform routing connection for the endpoint devices of the both communication parties.

With reference to the third aspect, in a first possible implementation manner, the information about the endpoint devices of the both communication parties includes one or more of identification information and topology location information of the endpoint devices of the both communication parties.

With reference to the third aspect, in a second possible implementation manner, the information about the endpoint devices of the both communication parties that need to perform route calculation is obtained in the following manner: the endpoint device manager receives quality information that is reported by an endpoint device and that is about communication with another endpoint device, and obtains, by screening, endpoint devices of both communication parties whose communication quality does not satisfy a preset communication quality requirement.

With reference to the third aspect, in a third possible implementation manner, the information about the endpoint devices of the both communication parties that need to perform route calculation is obtained in the following manner: the endpoint device manager receives identification information that is reported by an endpoint device and that is of endpoint devices of both communication parties whose communication quality does not satisfy a preset communication quality requirement.

With reference to the third possible implementation manner of the third aspect, in a fourth possible implementation manner, the information about the endpoint devices of the both communication parties that need to perform route calculation is obtained in the following manner: after detecting and obtaining communication quality information about communication with the peer endpoint device, the endpoint device determines the identification information of the endpoint devices of the both communication parties that do not satisfy the preset communication quality requirement.

With reference to the third aspect, in a fifth possible implementation manner, receiving, by an SDN controller, a route calculation request sent by an endpoint device manager includes receiving, by the SDN controller using a newly added interface of the endpoint device manager, the route calculation request sent by the endpoint device manager, or receiving, by the SDN controller using a unified arrangement module, the route calculation request sent by the endpoint device manager.

With reference to the fifth possible implementation manner of the third aspect, in a sixth possible implementation manner, the newly added interface uses the REST protocol.

Beneficial effects of the present disclosure are as follows.

In the embodiments of the present disclosure, an SDN controller first receives a route calculation request sent by an endpoint device manager, where the route calculation request carries information about endpoint devices of both communication parties that need to perform route calculation. Then the SDN controller performs, according to the information about the endpoint devices of the both communication parties, route calculation for the endpoint devices of the both communication parties that need to perform route calculation, and the SDN controller controls, according to calculated route information, a forwarding device to perform routing connection for the endpoint devices of the both communication parties.

That is, the SDN controller may perform, according to the route calculation request, route calculation for the endpoint devices of the both communication parties that need to perform route calculation, and control, according to the calculated route information, the forwarding device to perform routing connection for the endpoint devices of the both communication parties. Therefore, when communication between an endpoint device and a peer endpoint device does not satisfy a preset communication quality requirement, a communication path that is between the endpoint device and the peer endpoint device and that satisfies the preset communication quality requirement may be selected using the SDN controller. Therefore, a technical effect that a data center network can complete fault recovery is achieved, thereby further ensuring reliability of communication between endpoint devices.

Moreover, to use the solution, only a communications interface needs to be established between the endpoint device manager and the SDN controller. Therefore, if network construction costs are not increased, reliability of communication between the endpoint devices is ensured.

DESCRIPTION OF EMBODIMENTS

Figure 1A:
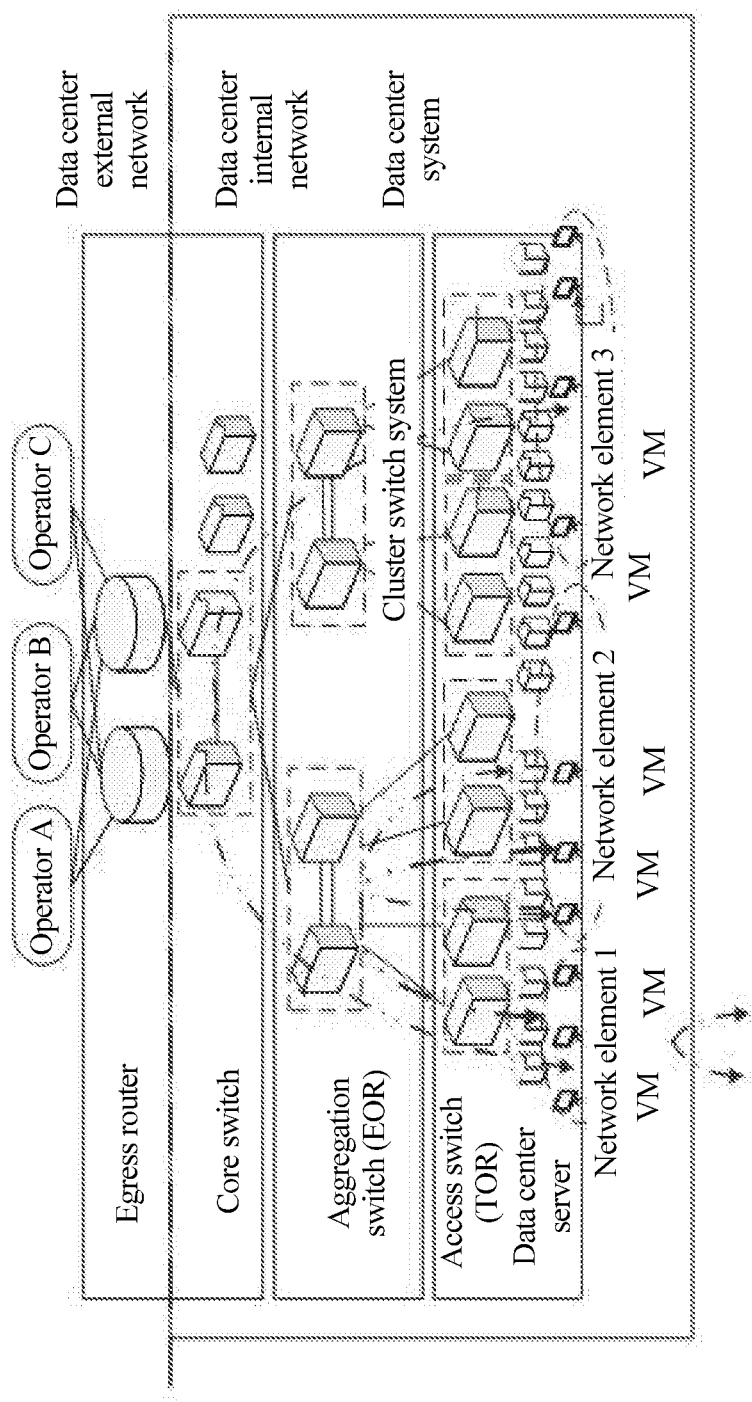
FIG. 1A is an architectural model diagram of a data center networking architecture and cloudified deployment of a telecommunication network element.
Figure 1B:
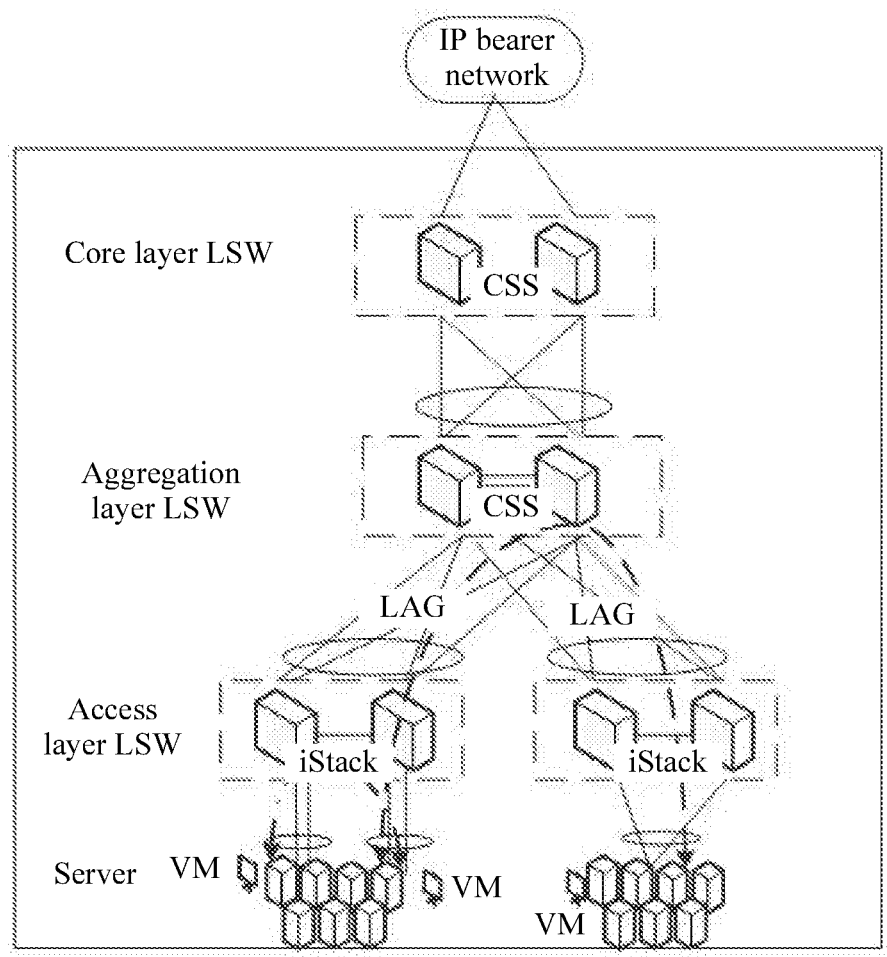
FIG. 1B is an architectural diagram of reliability of a data center network based on bundling and stacking.
Figure 1C:
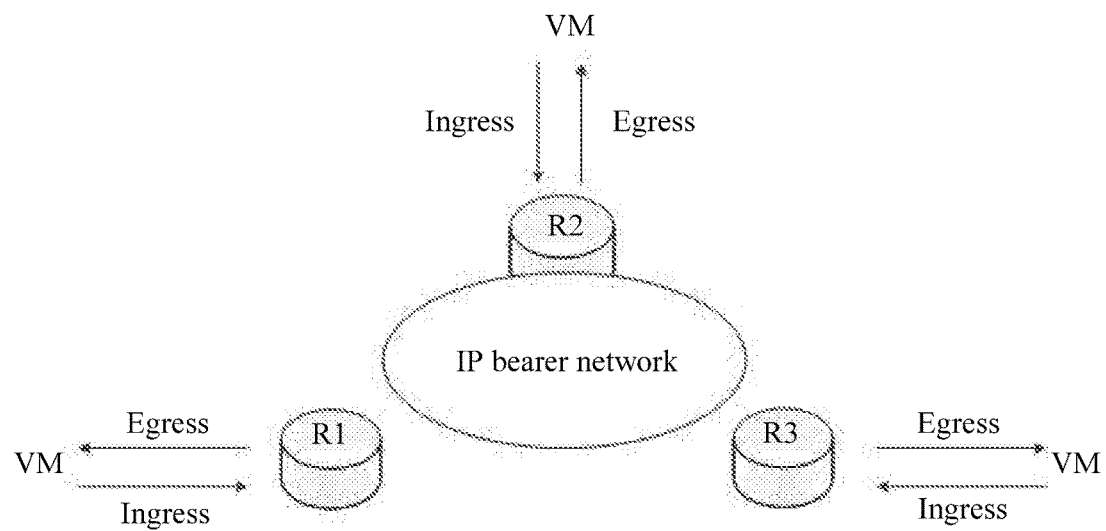
FIG. 1C is a schematic diagram of IP FPM.
Figure 2:
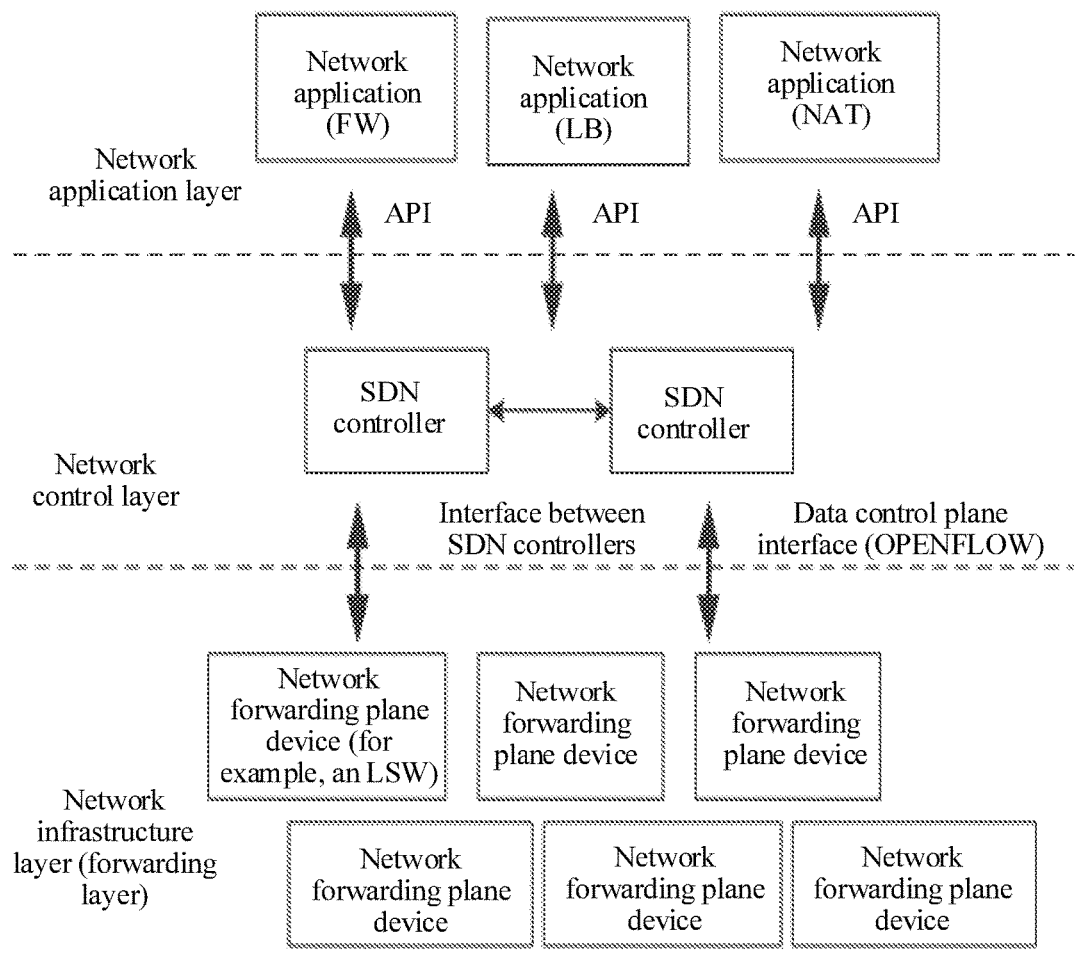
FIG. 2 is a schematic diagram of an SDN architecture in a data center system according to an embodiment of the present disclosure.

For a technical problem in the prior art that a data center network cannot complete fault recovery, a technical solution proposed in embodiments of the present disclosure includes a data center system, where a bearer network of the data center system is an SDN network. Referring to FIG. 2, FIG. 2 is a schematic diagram of an SDN architecture, including a network application layer, a network control layer, and a network infrastructure layer. The network infrastructure layer further includes at least one forwarding device.

A technical essence of an SDN technology is to separate a control plane of a current LSW/router from a forwarding plane of the current LSW/router. A network control plane is mainly implemented by an SDN controller at the network control layer. A specific forwarding path of each IP flow in the network is controlled by the SDN controller, and is delivered, using the OPENFLOW protocol, to a forwarding device for execution. Therefore, the forwarding path of each IP flow may be flexibly controlled by the SDN controller. A network forwarding plane is implemented by the forwarding device at the network infrastructure layer. The forwarding device is only responsible for forwarding a packet, and is not responsible for calculating and maintaining the forwarding path.

In the embodiments of the present application, a communication channel from the SDN controller to an endpoint device manager of the data center system is newly added in the foregoing SDN architecture such that the SDN controller may acquire a route calculation request using the communication channel.

In addition, a routing connection method is provided, where the method includes receiving, by an SDN controller, a route calculation request sent by an endpoint device manager, where the route calculation request carries information about endpoint devices of both communication parties that need to perform route calculation, performing, by the SDN controller according to the information about the endpoint devices of the both communication parties, route calculation for the endpoint devices of the both communication parties that need to perform route calculation, and controlling, by the SDN controller according to calculated route information, a forwarding device to perform routing connection for the endpoint devices of the both communication parties.

That is, the SDN controller may perform, according to the route calculation request, route calculation for the endpoint devices of the both communication parties that need to perform route calculation, and control, according to the calculated route information, the forwarding device to perform routing connection for the endpoint devices of the both communication parties. Therefore, when communication between an endpoint device and a peer endpoint device does not satisfy a preset communication quality requirement, a communication path that is between the endpoint device and the peer endpoint device and that satisfies the preset communication quality requirement may be selected using the SDN controller. Therefore, a technical effect that a data center network can complete fault recovery is achieved, thereby further ensuring reliability of communication between endpoint devices.

The following expounds main implementation principles of the technical solutions in the embodiments of the present disclosure, specific implementation manners thereof, and corresponding accomplishable beneficial effects with reference to each accompanying drawing.

Figure 3:
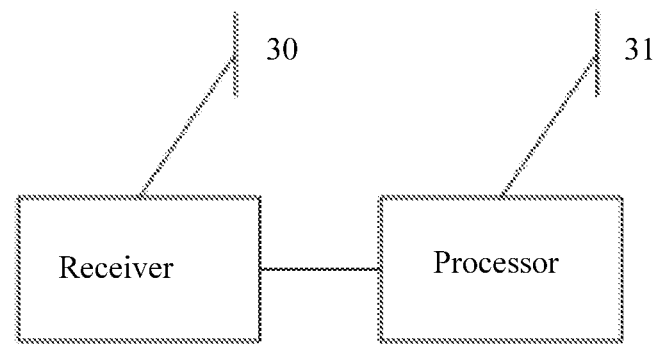
FIG. 3 is a structural diagram of an SDN controller according to an embodiment of the present disclosure.

According to a first aspect, an embodiment of the present disclosure provides an SDN controller, including a receiver 30 and a processor 31. Refer to FIG. 3, where the receiver 30 is configured to receive a route calculation request sent by an endpoint device manager, where the route calculation request carries information about endpoint devices of both communication parties that need to perform route calculation.

Optionally, the information about the endpoint devices of the both communication parties includes one or more of identification information and topology location information of the endpoint devices of the both communication parties.

For example, the identification information of the endpoint devices of the both communication parties is medium access control (MAC) addresses, IP addresses, or identifiers (IDs) of the endpoint devices of the both communication parties, where a MAC address of an endpoint device is, for example, 28-6e-d4-88-c4-f8.

For example, the topology location information is at least one type of information of an ID of a server and a MAC address of an associated and connected LSW. In a specific implementation process, after obtaining identification information of an endpoint device, the endpoint device manager may directly acquire prestored topology location information of the endpoint device. The topology location information is, for example, a MAC address+a port number of an LSW, for example, [70-7b-e8-ed-35-1c, 0/0/1]+[70-7b-e8-ed-35-0d, 1/1/12], for another example a MAC address through which an endpoint connects to the LSW, for example, [70-7b-e8-ed-35-1c]+[70-7b-e8-ed-35-0d]. In a specific implementation process, information about endpoint devices of both communication parties that is included in a route calculation request reported by the endpoint device manager to the SDN controller varies with a manner of calculating route information by the SDN controller. The information about the endpoint devices of the both communication parties is, for example, [ID of a source VM1, ID of a server 1, MAC address through which an LSW1 is connected]+[ID of a destination VM2, ID of a server 2, MAC address through which an LSW2 is connected], or [MAC address of a source VM1, MAC address through which an LSW1 is connected]+[MAC address of a destination VM2, MAC address through which an LSW2 is connected], or [MAC address of a source VM1, Access port number]+[MAC address of a destination VM2, Access port number].

Optionally, the information about the endpoint devices of the both communication parties that need to perform route calculation may be obtained in multiple manners. The following lists two manners for description. Certainly, in a specific implementation process, the manners are not limited to the following two cases.

First, the information about the endpoint devices of the both communication parties that need to perform route calculation is obtained in the following manner. The endpoint device manager receives quality information that is reported by an endpoint device and that is about communication with another endpoint device, and obtains, by screening, endpoint devices of both communication parties whose communication quality does not satisfy a preset communication quality requirement.

The endpoint device may be an endpoint device in an IP communications network, such as a VM or a physical machine.

The endpoint device manager may be a VM manager, a physical machine manager, or the like.

The communication quality information further includes at least one of on-off information about a communication path and information about quality of service (QoS).

For example, the endpoint device may detect on-off information about a communication path to another endpoint device, or detect QoS information, where the QoS information may further include multiple types of information, for example, a packet loss rate, delay information, jitter information, and an error rate.

After detecting the communication quality information, the endpoint device reports the communication quality information to the endpoint device manager. The endpoint device manager determines whether quality of communication between any two endpoint devices satisfies the preset communication quality requirement in order to obtain, by screening, the endpoint devices of the both communication parties whose communication quality does not satisfy the preset communication quality requirement.

For example, if communication quality information is the on-off information about the communication path, the preset communication quality requirement may be the communication path is in a connected state. It is assumed that an endpoint device is a VM1. Other endpoint devices communicating with the VM1 include a VM2, a VM3, a VM4, and a VM5, and on-off information about communication paths between the VM2, the VM3, the VM4, and the VM5 and the VM1 is shown in Table 1:

TABLE 1

|  | Peer endpoint device | | | |
| --- | --- | --- | --- | --- |
|  | VM2 | VM3 | VM4 | VM5 |
| On-off information | Disconnected state | Connected state | Connected state | Disconnected state |

According to the preset communication quality requirement, it may be determined that quality of communication between the VM1 and two endpoint devices VM2 and VM5 does not satisfy the preset communication quality requirement, and the endpoint device manager obtains, by screening, the following information about endpoint devices of both communication parties that need to perform route calculation: [VM1, VM2], and [VM1, VM5].

If the communication quality is the packet loss rate in the QoS information, where a higher packet loss rate indicates lower quality of communication between the endpoint device and another endpoint device, or even a fault occurs. Therefore, a packet loss rate threshold may be set, for example, 10% or 20%. When the packet loss rate exceeds the packet loss rate threshold, it indicates that quality of communication between the endpoint devices of the both communication parties does not satisfy the preset communication quality requirement.

Because services and communication protocols between different endpoint devices of both communication parties are different, capabilities of packet loss concealment are also different. Therefore, different packet loss rate thresholds may further be set for different endpoint devices of both communication parties. Still in terms of the previously listed five VMs, packet loss rate thresholds shown in Table 2 may be set.

TABLE 2

|  | Endpoint devices of both communication parties | | | |
| --- | --- | --- | --- | --- |
|  | [VM1, VM2] | [VM1, VM3] | [VM1, VM4] | [VM1, VM5] |
| Packet loss rate threshold | 5% | 10% | 5% | 15% |

Certainly, the foregoing packet loss rate thresholds are only an example, and constitute no limitation.

When the communication quality is other QoS information, for example, delay information, jitter information, or an error rate, a manner of determining whether the quality of communication between the endpoint devices of the both communication parties satisfies the preset communication quality requirement is similar to a manner of the determining using the packet loss rate, and details are not described herein again.

In the foregoing solution, the endpoint device sends the communication quality information to the endpoint device manager, and then the endpoint device manager obtains, by screening, the information about the endpoint devices of the both communication parties that do not satisfy the preset communication quality requirement. Therefore, a technical effect of reducing processing load of the endpoint device is achieved.

Second, the information about the endpoint devices of the both communication parties that need to perform route calculation is obtained in the following manner. The endpoint device manager receives identification information that is reported by an endpoint device and that is of endpoint devices of both communication parties whose communication quality does not satisfy a preset communication quality requirement.

Furthermore, the endpoint device manager does not need to receive the communication quality information from the endpoint device, and directly receives, from the endpoint device, the information about the endpoint devices of the both communication parties that need to perform route calculation.

Optionally, the information about the endpoint devices of the both communication parties that need to perform route calculation is obtained in the following manner. The endpoint device determines the identification information of the endpoint devices of the both communication parties that do not satisfy the preset communication quality requirement after detecting and obtaining communication quality information about communication with a peer endpoint device.

The communication quality information further includes at least one of on-off information about a communication path and information about QoS.

A process in which the endpoint device obtains, by screening according to the communication quality information, the identification information of the endpoint devices of the both communication parties that do not satisfy the preset communication quality requirement is similar to a screening process of the endpoint device manager, and therefore details are not described herein again.

In the foregoing solution, because the endpoint device directly obtains, by screening, the endpoint devices of the both communication parties that do not satisfy the preset communication quality requirement, information that is sent by the endpoint device to the endpoint device manager may include only the information about the endpoint devices of the both communication parties that do not satisfy the preset communication quality requirement, information about endpoint devices of both communication parties that satisfy the preset communication quality requirement does not need to be reported, and the communication quality information may also not be uploaded. Therefore, a technical effect of reducing data transmission traffic is achieved.

Optionally, the receiver 30 may receive the route calculation request sent by the endpoint device manager in multiple manners. The following lists two manners for description. Certainly, in a specific implementation process, the manners are not limited to the following two cases.

In a possible implementation manner, the receiver 30 receives, using a newly added interface of the endpoint device manager, the route calculation request sent by the endpoint device manager.

Optionally, the newly added interface uses the REST protocol. The REST protocol defines a group of architecture principles such that a Web service centering on a system resource may be designed according to these principles. The Web service centering on the system resource includes, how a client compiled using different languages processes and transmits a resource status over hypertext transfer protocol (HTTP).

In the foregoing solution, only a communications interface needs to be established between the endpoint device manager and the SDN controller. Therefore, if network construction costs are not increased, reliability of communication between the endpoint devices is ensured.

In another possible implementation manner, the receiver 30 receives, using a unified arrangement module, the route calculation request sent by the endpoint device manager.

Further, that is, the endpoint device manager does not directly send the route calculation request to the SDN controller, but uses the unified arrangement module to forward the route calculation request to the SDN controller.

The processor 31 is configured to perform route calculation for the endpoint devices of the both communication parties that need to perform route calculation, and control, according to calculated route information, a forwarding device to perform routing connection for the endpoint devices of the both communication parties.

In a specific implementation process, the processor 31 performs route calculation for the endpoint devices of the both communication parties that need to perform route calculation may be calculation is performed when the communication quality of the endpoint devices of the both communication parties does not satisfy the preset communication quality requirement, or calculation is performed when the endpoint devices of the both communication parties are first connected, which is not limited in this embodiment of the present disclosure.

That the processor 31 performs route calculation for the endpoint devices of the both communication parties that need to perform route calculation is for example:

1. The processor 31 of the SDN controller receives, from a newly added interface ②, MAC addresses of the endpoint devices of the both communication parties whose communication quality does not satisfy the preset communication quality requirement and LSW information of an access location that are sent by the endpoint device manager;

2. The processor 31 of the SDN controller selects a forwarding table entry of a flow that is from N flows in an LSW to which source and destination VMs connect and for which no exception is reported to replace an original flow forwarding table entry of the endpoint devices of the both communication parties whose communication quality does not satisfy the preset communication quality requirement, where the flow forwarding table entry is route information that is obtained after the route calculation is performed. Furthermore, one group of endpoint devices of both communication parties is one flow, and a quantity of flows in an LSW is generally massive. If there is only one flow in the beginning and communication is abnormal, a new path may be determined in at least the following two manners: (1) Calculation is performed on all available paths to acquire a new path with relatively high quality; (2) Switching to any new path is performed for attempt, and if communication quality satisfies the preset communication quality requirement, the new path is used as a new path of the group of endpoint devices of both communication parties. Otherwise, switching continues to be performed for attempt until the communication quality of the group of endpoint devices of both communication parties satisfies the preset communication quality requirement.

In a specific implementation process, after performing route calculation for the endpoint devices of the both communication parties that need to perform route calculation and obtaining route information, the processor 31 distributes the route information to each forwarding device such that the forwarding device updates a routing table according to the route information, and controls, according to an updated routing table, the endpoint devices of the both communication parties to perform routing connection.

Figure 4:
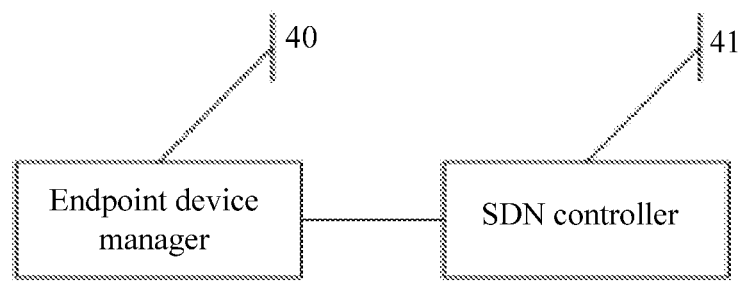
FIG. 4 is a structural diagram of a data center system according to an embodiment of the present disclosure.

According to a second aspect, based on a same inventive concept, an embodiment of the present disclosure provides a data center system. Referring to FIG. 4, the data center system further includes an endpoint device manager 40 and an SDN controller 41.

The endpoint device manager 40 is configured to send a route calculation request to the SDN controller, where the route calculation request carries information about endpoint devices of both communication parties that need to perform route calculation.

The SDN controller 41 is configured to perform, according to the route calculation request, route calculation for the endpoint devices of the both communication parties that need to perform route calculation, and control, according to calculated route information, a forwarding device to perform routing connection for the endpoint devices of the both communication parties.

Optionally, the endpoint device manager 40 is further configured to receive quality information that is reported by an endpoint device and that is about communication with another endpoint device, obtain, by screening, endpoint devices of both communication parties whose communication quality does not satisfy a preset communication quality requirement, and add the endpoint devices of the both communication parties to the route calculation request as the information about the endpoint devices of the both communication parties that need to perform route calculation.

Optionally, the endpoint device manager 40 is further configured to receive identification information that is reported by an endpoint device and that is of endpoint devices of both communication parties whose communication quality does not satisfy a preset communication quality requirement, and carry the identification information in the route calculation request as the information about the endpoint devices of the both communication parties that need to perform route calculation.

Figure 5:
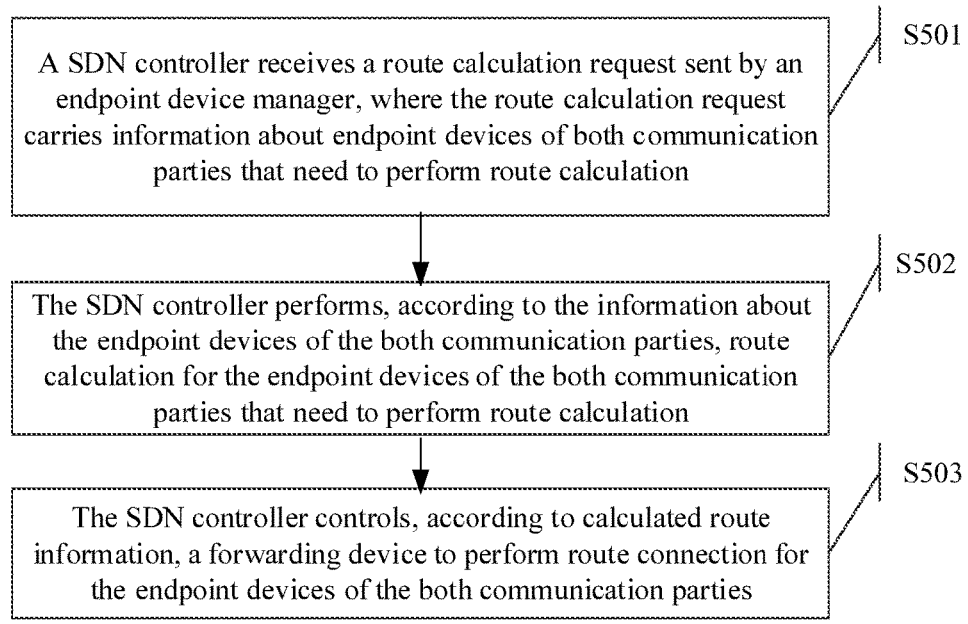
FIG. 5 is a flowchart of a routing connection method according to an embodiment of the present disclosure.

According to a third aspect, based on a same inventive concept, an embodiment of the present disclosure provides a routing connection method. Referring to FIG. 5, the routing connection method includes the following steps.

Step S501: An SDN controller receives a route calculation request sent by an endpoint device manager, where the route calculation request carries information about endpoint devices of both communication parties that need to perform route calculation.

Step S502: The SDN controller performs, according to the information about the endpoint devices of the both communication parties, route calculation for the endpoint devices of the both communication parties that need to perform route calculation.

Step S503: The SDN controller controls, according to calculated route information, a forwarding device to perform routing connection for the endpoint devices of the both communication parties.

Optionally, the information about the endpoint devices of the both communication parties includes one or more of identification information and topology location information of the endpoint devices of the both communication parties.

Optionally, the information about the endpoint devices of the both communication parties that need to perform route calculation is obtained in the following manner. The endpoint device manager receives quality information that is reported by an endpoint device and that is about communication with another endpoint device, and obtains, by screening, endpoint devices of both communication parties whose communication quality does not satisfy a preset communication quality requirement.

Optionally, the information about the endpoint devices of the both communication parties that need to perform route calculation is obtained in the following manner. The endpoint device manager receives identification information that is reported by an endpoint device and that is of endpoint devices of both communication parties whose communication quality does not satisfy a preset communication quality requirement.

Optionally, the information about the endpoint devices of the both communication parties that need to perform route calculation is obtained in the following manner. The endpoint device determines identification information of endpoint devices of both communication parties that do not satisfy the preset communication quality requirement after detecting and obtaining communication quality information about communication with a peer endpoint device.

Optionally, an SDN controller receives a route calculation request sent by an endpoint device manager includes receiving, by the SDN controller using a newly added interface of the endpoint device manager, the route calculation request sent by the endpoint device manager, or receiving, by the SDN controller using a unified arrangement module, the route calculation request sent by the endpoint device manager.

Optionally, the newly added interface uses the REST protocol.

Embodiment 1

In this embodiment of the present application, a communication channel from an SDN controller to a VM manager of a data center system is newly added in an SDN architecture in FIG. 2 such that the SDN controller may acquire a route calculation request using the communication channel.

Figure 6:
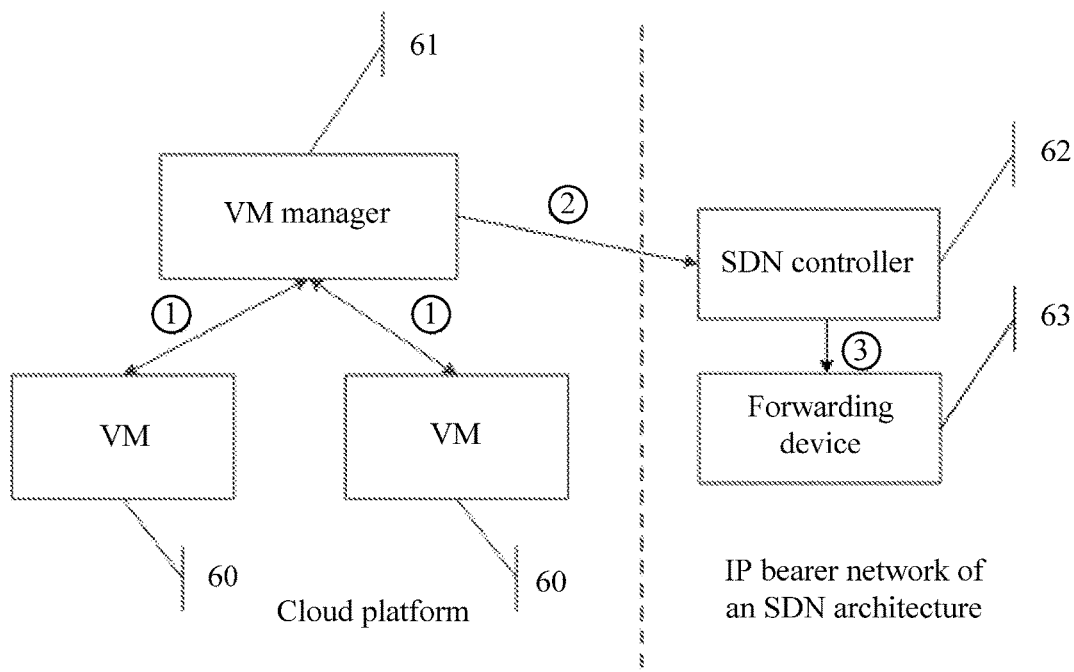
FIG. 6 is a structural diagram of a data center system according to Embodiment 1 of the present disclosure.

Referring to FIG. 6, a data center system described in Embodiment 1 of the present disclosure includes a VM 60, a VM manager 61, and an SDN controller 62.

The VM 60 is configured to communicate with a peer VM, detect quality of communication with the peer VM, and report communication quality information to the VM manager 61 using an interface ①, where the reported communication quality information is further shown in Table 3:

TABLE 3

| | Endpoint devices of both communication parties | | |
|---|---|---|---|
| | [VM60, VMa] | [VM60, VMb] | [VM60, VMc] |
| Delay information milliseconds (ms) | 200 | 100 | 2600 |

The VM manager 61 obtains, by screening delay information reported by the VM60, endpoint devices of both communication parties that are corresponding to delay information greater than 160 ms (that is, obtains, by screening, endpoint devices of both communication parties whose communication quality does not satisfy a preset communication quality requirement), that is, [VM60, VMa] and [VM60, VMc].

Then, the VM manager 61 reports, to the SDN controller 62 using an interface ②, a route calculation request that includes identification information [VM 60, VMa] and [VM60, VMc] and topology location information, where the route calculation request includes, for example, the following information:

[MAC address of the VM60, MAC address through which an LSW1 is connected]+[MAC address of the VMa, MAC address through which an LSW2 is connected], and

[MAC address of the VM60, MAC address through which the LSW1 is connected]+[MAC address of the VMc, MAC address through which an LSW3 is connected].

The SDN controller is configured to perform, according to the route calculation request, route calculation for endpoint devices of both communication parties that need to perform route calculation, which further includes route information corresponding to [VM60, VMa] and [VM60, VMc] is respectively calculated using [MAC address of the VM60, MAC address through which the LSW1 is connected]+[MAC address of the VMa, MAC address through which the LSW2 is connected] and [MAC address of the VM60, MAC address through which the LSW1 is connected]+[MAC address of the VMc, MAC address through which the LSW3 is connected]. A forwarding device 63 of the data center system is notified of the calculated route information using an interface ③. A routing switching algorithm may be used to select a normal path from N flow paths of an LSW to replace a path whose communication is abnormal. Therefore, using the route information, it can be ensured that quality of communication between an endpoint device and a peer endpoint device satisfies the preset communication quality requirement.

Embodiment 2

Figure 7:
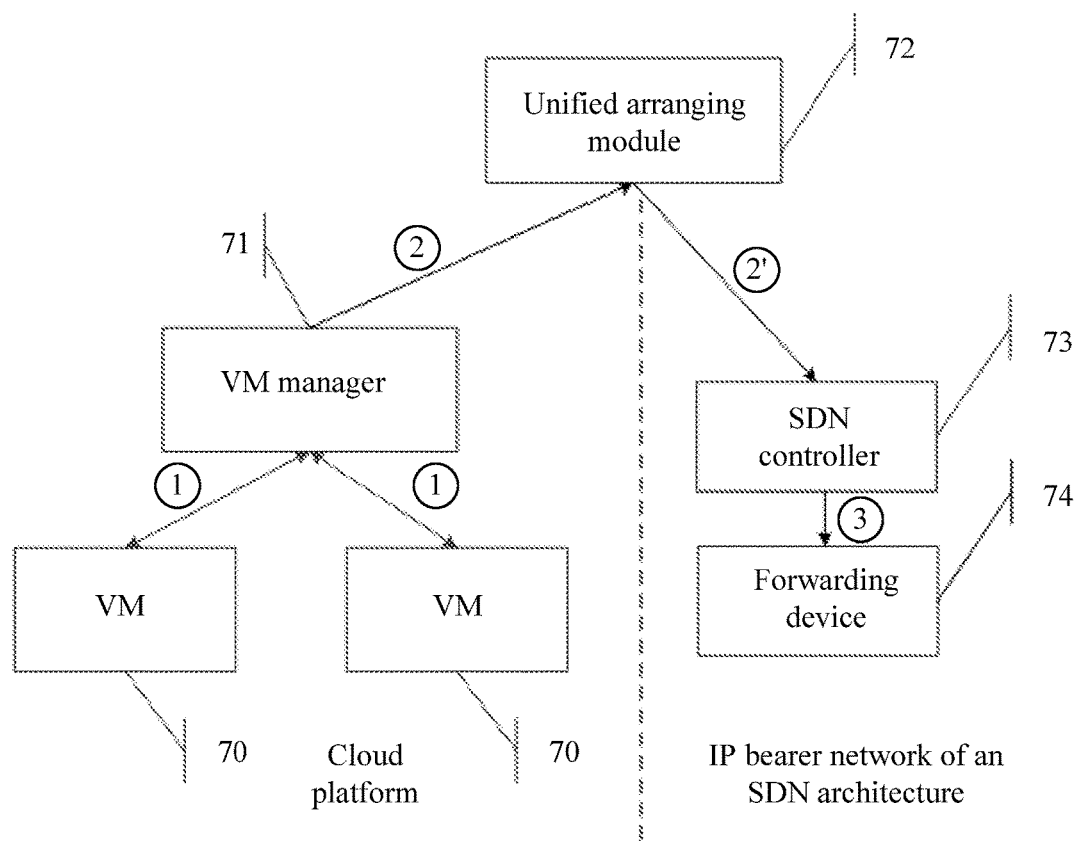
FIG. 7 is a structural diagram of a data center system according to Embodiment 2 of the present disclosure.

In this embodiment, a bearer network of a data center system is still an SDN architecture. Referring to FIG. 7, the data center system includes a VM 70, a VM manager 71, a unified arrangement module 72, and an SDN controller 73.

The VM 70 is further configured to detect and obtain on-off information about a communication path through which communication with a peer VM is performed, which is shown in Table 4:

TABLE 4

| | Endpoint devices of both communication parties | | |
|---|---|---|---|
| | [VM70, VMa] | [VM70, VMb] | [VM70, VMc] |
| On-off information | Disconnected state | Connected state | Connected state |

Then, the VM 70 determines that quality of communication with the VMa does not satisfy a preset communication quality requirement, and therefore reports, to the VM manager 71 using an interface ①, identification information of endpoint devices of both communication parties that do not satisfy the preset communication quality requirement, that is, [VM70, VMa].

The VM manager 71 is further configured to obtain topology location information of [VM70, VMa] in order to obtain a route calculation request that includes the identification information [VM70, VMa] and the topology location information after [VM70, VMa] reported by the VM70 is received, for example, [VM70, ID of a server 1, MAC address of an LSW1]+[VMa, ID of a server 2, MAC address of an LSW2]. Then, the VM manager 71 reports the route calculation request to the unified arrangement module 72 using an interface ②.

The unified arrangement module 72 is further configured to send the route calculation request to the SDN controller 73 using an interface ②' after the route calculation request sent by the VM manager 71 is received.

The SDN controller 73 is configured to perform route calculation for [VM70, VMa] based on [VM70, ID of the server 1, MAC address of the LSW1]+[VMa, ID of the server 2, MAC address of the LSW2], and then send, using an interface ③, route information that is obtained through calculation to a forwarding device 74 of the data center system.

Endpoint devices of both communication parties that do not satisfy the preset communication quality requirement perform routing according to recalculated route information that is forwarded by the forwarding device 74.

Beneficial effects of the present disclosure are as follows.

In this embodiment of the present disclosure, an SDN controller may perform, according to a route calculation request, route calculation for endpoint devices of both communication parties that need to perform route calculation, and control, according to calculated route information, a forwarding device to perform routing connection for the endpoint devices of the both communication parties. Therefore, when communication between an endpoint device and a peer endpoint device does not satisfy a preset communication quality requirement, a communication path that is between the endpoint device and the peer endpoint device and that satisfies the preset communication quality requirement may be selected using the SDN controller. Therefore, a technical effect that a data center network can complete fault recovery is achieved, thereby further ensuring reliability of communication between endpoint devices.

Moreover, to use the solution, only a communications interface needs to be established between the endpoint device manager and the SDN controller. Therefore, if network construction costs are not increased, the reliability of the communication between the endpoint devices is ensured.

Moreover, in the foregoing solution, communication quality detection is completed by the endpoint device and does not depend on an existing fault detection technology (for example, an Ethernet OAM technology or an IP FPM technology) in an LSW/router. The LSW/router has a great difficulty in identifying a specific communication endpoint and a service thereof. Therefore, detection and determining by a communication endpoint are more direct and accurate.

Moreover, the endpoint device does not need to detect and maintain multiple communication paths (for example, a primary path and multiple secondary paths), and only needs to detect communication quality information of a current path. Therefore, a design of the endpoint device is simplified. For example, overhead of a probe packet for detecting quality of communication between endpoint devices is saved, and a transceiving status of a service packet is directly used to detect the communication quality.

Moreover, in this embodiment of the present disclosure, route calculation may also be performed on the endpoint devices of the both communication parties when the endpoint devices of the both communication parties are first connected. Therefore, a technical effect that reliability of communication between first connected endpoint devices is ensured is achieved.

Persons skilled in the art should understand that the embodiments of the present application may be provided as a method, a system, or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a compact disc read-only memory (CD-ROM), an optical memory, and the like) that include computer usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although some preferred embodiments of the present application have been described, persons skilled in the art can make changes and modifications to these embodiments once they learn the basic inventive concept. Therefore, the following claims are intended to be construed as to cover the preferred embodiments and all changes and modifications falling within the scope of the present application.

Obviously, persons skilled in the art can make various modifications and variations to the embodiments of this application without departing from the spirit and scope of the embodiments of the present disclosure. This application is intended to cover these modifications and variations provided that they fall within the scope of protection defined by the following claims and their equivalent technologies.

What is claimed is:

1. A software defined networking (SDN) controller, comprising:
   a receiver configured to receive a route calculation request from an endpoint device manager, wherein the route calculation request carries information about a first endpoint device and a second endpoint device when an existing communication quality between the first endpoint device and the second endpoint device does not meet a preset communication quality requirement; and
   a processor coupled to the receiver and configured to:
   perform a route calculation for the first endpoint device and the second endpoint device based on the route calculation request;
   select a route between the first endpoint device and the second endpoint device from a plurality of routes based at least in part on the route calculation and communication quality information, wherein the communication quality information comprises multiple types of quality of service information from at least one of the first endpoint device or the second endpoint device;
   control, according to the selected route, a forwarding device to perform routing connection for the first endpoint device and the second endpoint device; and
   receive, using a newly added interface of the endpoint device manager, the route calculation request from the endpoint device manager, wherein the newly added interface uses a representational state transfer (REST) protocol.

2. The SDN controller of claim 1, wherein the information about the first endpoint device and the second endpoint device comprises one or more of identification information or topology location information of the endpoint devices of the two communication parties.

3. The SDN controller of claim 1, wherein the information about the first endpoint device and the second endpoint device is obtained by:
   receiving, by the endpoint device manager, the communication quality information; and
   screening the first endpoint device or the second endpoint device.

4. The SDN controller of claim 1, wherein the information about the first endpoint device and the second endpoint device is obtained by receiving, by the endpoint device manager, identification information from the at least one of the first endpoint device or the second endpoint device.

5. The SDN controller of claim 4, wherein the information about the first endpoint device and the second endpoint device is obtained by determining, by the first endpoint device, the identification information of the first endpoint device and the second endpoint device after detecting and obtaining communication quality information about communication with a peer endpoint device.

6. The SDN controller of claim 1, wherein the receiver is further configured to receive, using a unified arrangement component, the route calculation request from the endpoint device manager.

7. The SDN controller of claim 1, wherein the multiple types of quality of service information comprise a packet loss rate, delay information, jitter information, and an error rate that are received by the SDN controller from the at least one of the first endpoint device and the second endpoint device.

8. A data center system, comprising:
   an endpoint device manager configured to send a route calculation request to a software defined networking (SDN) controller, wherein the route calculation request carries information about a first endpoint device and a second endpoint device when an existing communication quality between the first endpoint device and the second endpoint device does not meet a presser communication quality requirement; and
   the SDN communicatively coupled to the endpoint device manager, wherein the SDN is configured to:
   perform, according to the route calculation request, a route calculation for the first endpoint device and the second endpoint device based on the route calculation request;
   select a route between the first endpoint device and the second endpoint device from a plurality of routes based at least in part on the route calculation and communication quality information, wherein the communication quality information comprises multiple types of quality of service information from at least one of the first endpoint device or the second endpoint device;
   control, according to the selected route, a forwarding device to perform routing connection for the first endpoint device and the second endpoint device; and
   receive, using a newly added interface of the endpoint device manager, the route calculation request from the endpoint device manager, wherein the newly added interface uses a representational state transfer (REST) protocol.

9. The data center system of claim 8, wherein the endpoint device manager is further configured to:

receive the communication quality information;
screen the first endpoint device and the second endpoint device; and
add identification information of the first endpoint device and the second endpoint device to the route calculation request.

10. The data center system of claim 8, wherein the endpoint device manager is further configured to:
receive identification information from the first endpoint device and the second endpoint device; and
add the identification information to the route calculation request.

11. A routing connection method, comprising:
receiving, by a software defined networking (SDN) controller, a route calculation request from an endpoint device manager, wherein the route calculation request carries information about a first endpoint device and a second endpoint device when an existing communication quality between the first endpoint device and the second endpoint device does not meet a presser communication quality requirement;
performing, by the SDN controller a route calculation for the first endpoint device and the second endpoint device based on the route calculation request;
selecting, by the SDN controller, a route between the first endpoint device and the second endpoint device from a plurality of routes based at least in part on the route calculation and communication quality information, wherein the communication quality information comprises multiple types of quality of service information from at least one of the first endpoint device or the second endpoint device;
controlling, by the SDN controller and according to the selected route, a forwarding device to perform routing connection for the first endpoint device and the second endpoint device; and
receiving, by the SDN controller using a newly added interface of the endpoint device manager, the route calculation request from the endpoint device manager, wherein the newly added interface uses a representational state transfer (REST) protocol.

12. The method of claim 11, wherein the information about the first endpoint device and the second endpoint device comprises one or more of identification information or topology location information of the endpoint devices of the two communication parties.

13. The method of claim 11, wherein the information about the first endpoint device and the second endpoint device is obtained by:
receiving, by the endpoint device manager, the quality information; and
screening the first endpoint device and the second endpoint device.

14. The method of claim 11, wherein the information about the first endpoint device and the second endpoint device is obtained by receiving, by the endpoint device manager, identification information from the first endpoint device or the second endpoint device.

15. The method of claim 14, wherein the information about the first endpoint device and the second endpoint device is obtained by determining, by the at least one of the first endpoint device or the second endpoint device, the identification information of the first endpoint device and the second endpoint device after detecting and obtaining communication quality information about communication with a peer endpoint device.

16. The method of claim 11, wherein receiving, by the SDN controller, the route calculation request from the endpoint device manager comprises receiving, by the SDN controller using a unified arrangement component, the route calculation request from the endpoint device manager.

* * * * *

UNITED STATES PATENT AND TRADEMARK OFFICE
CERTIFICATE OF CORRECTION

PATENT NO. : 10,454,806 B2
APPLICATION NO. : 15/199194
DATED : October 22, 2019
INVENTOR(S) : Qinghua Yu and Xinhua Yang Page 1 of 1

It is certified that error appears in the above-identified patent and that said Letters Patent is hereby corrected as shown below:

In the Claims

Claim 10, Column 17, Line 10: "device and the second" should read "device or the second"

Signed and Sealed this
Seventeenth Day of December, 2019

Andrei Iancu
*Director of the United States Patent and Trademark Office*